United States Patent [19]
Drummond

[11] 4,138,860
[45] Feb. 13, 1979

[54] CHILLER FOR EDIBLE PRODUCTS
[75] Inventor: Russell F. Drummond, Marietta, Ga.
[73] Assignee: U.S. Industries, Inc., New York, N.Y.
[21] Appl. No.: 833,227
[22] Filed: Sep. 14, 1977
[51] Int. Cl.² .................................................. F25D 17/02
[52] U.S. Cl. .......................................... 62/375; 62/64
[58] Field of Search .................... 62/63, 64, 374, 375, 62/380

[56] References Cited
U.S. PATENT DOCUMENTS

| 466,043 | 12/1891 | Hunt | 198/706 |
|---|---|---|---|
| 503,870 | 8/1893 | McCaslin | 198/706 |
| 552,664 | 1/1896 | Hunt | 174/60 |
| 714,149 | 11/1902 | Clarke | 198/706 |
| 1,865,168 | 6/1932 | Buhr | 62/63 |
| 1,880,232 | 10/1932 | Birdseye | 62/375 |
| 1,898,758 | 2/1933 | Bottoms | 62/375 |
| 2,014,550 | 9/1935 | Birdseye et al. | 62/375 |
| 2,153,742 | 4/1939 | Conn | 62/64 |
| 2,186,302 | 1/1940 | Martin | 62/380 |
| 2,200,331 | 5/1940 | Fisher | 62/64 |
| 3,053,486 | 9/1962 | Meyer | 244/177 |
| 3,173,276 | 3/1965 | Martin | 62/380 |
| 3,315,489 | 4/1967 | Zebarth et al. | 62/266 |
| 3,381,796 | 5/1968 | Gregor | 198/706 |
| 3,664,146 | 5/1972 | Butts | 62/374 |
| 3,718,007 | 2/1973 | Randrup | 62/374 |
| 3,777,988 | 12/1973 | Thompson | 62/64 |
| 3,844,135 | 10/1974 | Zamiara | 62/375 |

Primary Examiner—Ronald C. Capossela
Attorney, Agent, or Firm—Price, Heneveld, Huizenga & Cooper

[57] ABSTRACT

A chiller for edible food products of the type employing hygroscopic liquid refrigerant is disclosed. The chiller includes an enclosure having an entrance and an exit. A conveyor transports edible food products within the enclosure from the entrance to the exit thereof. The conveyor defines a plurality of angled flights or runs which extend within the enclosure in spaced, parallel relationship to each other and transport the product generally vertically and horizontally along each of the flights within the enclosure in a serpentine fashion. A liquid refrigerant supply including a distribution pan is supported above the enclosure for directing liquid refrigerant downwardly over the edible food products carried by the conveyor. The liquid refrigerant contacts or intersects several of the flights in a cascading manner thereby contacting a plurality of the food products which are vertically spaced and carried on different flights of the conveyor.

19 Claims, 9 Drawing Figures

CHILLER FOR EDIBLE PRODUCTS

BACKGROUND OF THE INVENTION

The present invention relates to a refrigerating apparatus and more particularly to food product chillers of the type employing cooled, hygroscopic liquid refrigerant.

In various food processing operations, it is necessary that the food product be chilled or surface frozen to preserve the color and appearance of the products after initial preparation. For example, in the processing of poultry it has been common practice to quick freeze the poultry parts and/or whole poultry carcasses after dressing. Also, in the processing of meat products such as sausage, the product may be frozen after wrapping in the casing. Such quick freezing has typically been accomplished with chillers which include some form of conveyor for transporting the product through an enclosure. When the product is within the enclosure, it is contacted by sprays or streams of cooled, liquid refrigerant such as propylene glycol. A distribution system is provided so that the glycol is directed downwardly within the enclosure, collected at the bottom of the enclosure, passed through a suitable heat exchanger and recirculated to pass through the enclosure again.

An example of one such prior chiller may be found in U.S. Pat. No. 3,315,489, entitled POULTRY FREEZING APPARATUS OF THE LIQUID SPRAY TYPE, and issued on Apr. 25, 1976 to R. S. Zebarth et al. The chiller disclosed in this prior patent includes at least a pair of vertically spaced, horizontally extending belts. The belts are positioned within an enclosure having entrance openings at one end and exit openings at the opposite end. A liquid refrigerant distribution system is supported within the enclosure above the belts. The poultry product is placed on the belts at one end of the enclosure and is contacted by streams or sprays of the liquid refrigerant as it passes from one end of the enclosure to the opposite end of the enclosure. The liquid refrigerant, which contacts the uppermost of the belts within the enclosure, is collected and passed downwardly to contact the belt positioned therebelow.

Another example of a chiller apparatus employing a liquid refrigerant may be found in U.S. Pat. No. 2,200,331, entitled AN APPARATUS FOR FREEZING BERRIES, and issued on May 14, 1940 to H. R. Fisher. The apparatus disclosed in this latter patent does not employ a conveyor but does, however, use a cooled liquid refrigerant to chill food product such as berries and other similar vegetable products.

Heretofore, the prior liquid chillers, although operating to obtain the desired results have had certain inherent drawbacks relating to the amount of floor space required in a plant for such apparatus, the length of residence time of the food product within the enclosure of the apparatus to obtain the desired cooling and other disadvantages relating to efficiency of operation.

A need exists for an improved apparatus for chilling edible food products, such as sausage, whereby increased efficiency may be obtained, the floor space requirements may be reduced and/or increased product handling rates may be obtained and desirable cost economies may be achieved.

SUMMARY OF THE INVENTION

In accordance with the present invention, a highly efficient edible food product chiller is provided whereby the problems and disadvantages heretofore experienced may be substantially eliminated. Essentially, the unique chiller for edible food products includes an enclosure and a conveyor means for conveying edible food products through the enclosure. The conveyor means defines a plurality of angled flights with the flights extending in spaced, parallel, vertical relation to each other and each of the flights being positioned in a plane angled with respect to vertical. Means are provided for directing cooled, liquid refrigerant downwardly over the edible food products carried by the conveyor in a cascading fashion so that each stream or spray of refrigerant may contact food product positioned on a plurality of flights or runs of the conveyor.

The chiller is accordance with the present invention provides increased efficiency when compared to prior chillers. The chiller is capable of increased production rates, a reduction in floor space requirements per quantity of food product chilled, reduced residence times and resulting cost economies.

DETAILED DESCRIPTION OF THE PREFERRED EMBODIMENT

Figure 1:
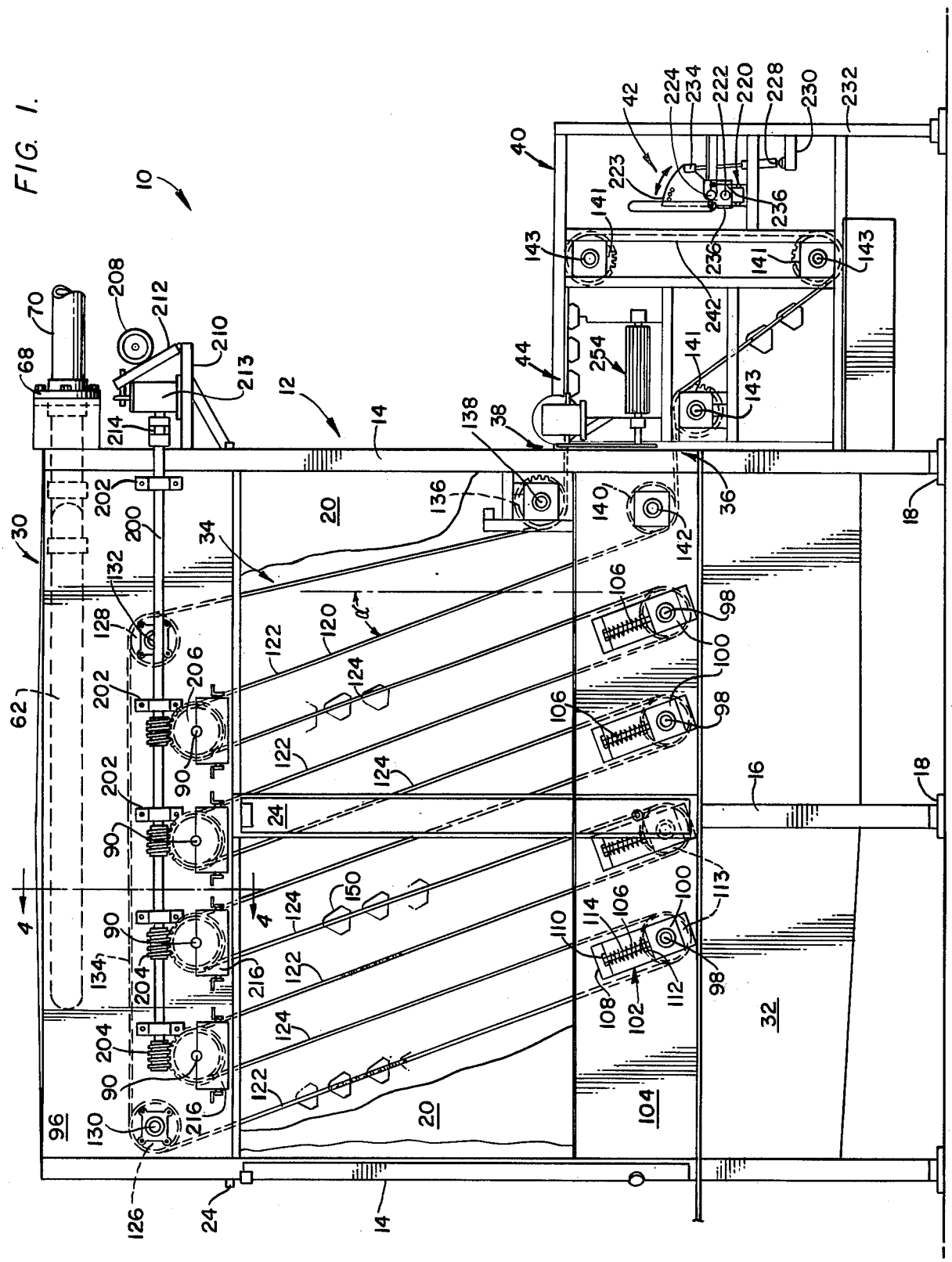
FIG. 1 is a side, elevational view of a chiller in accordance with the present invention.
Figure 2:
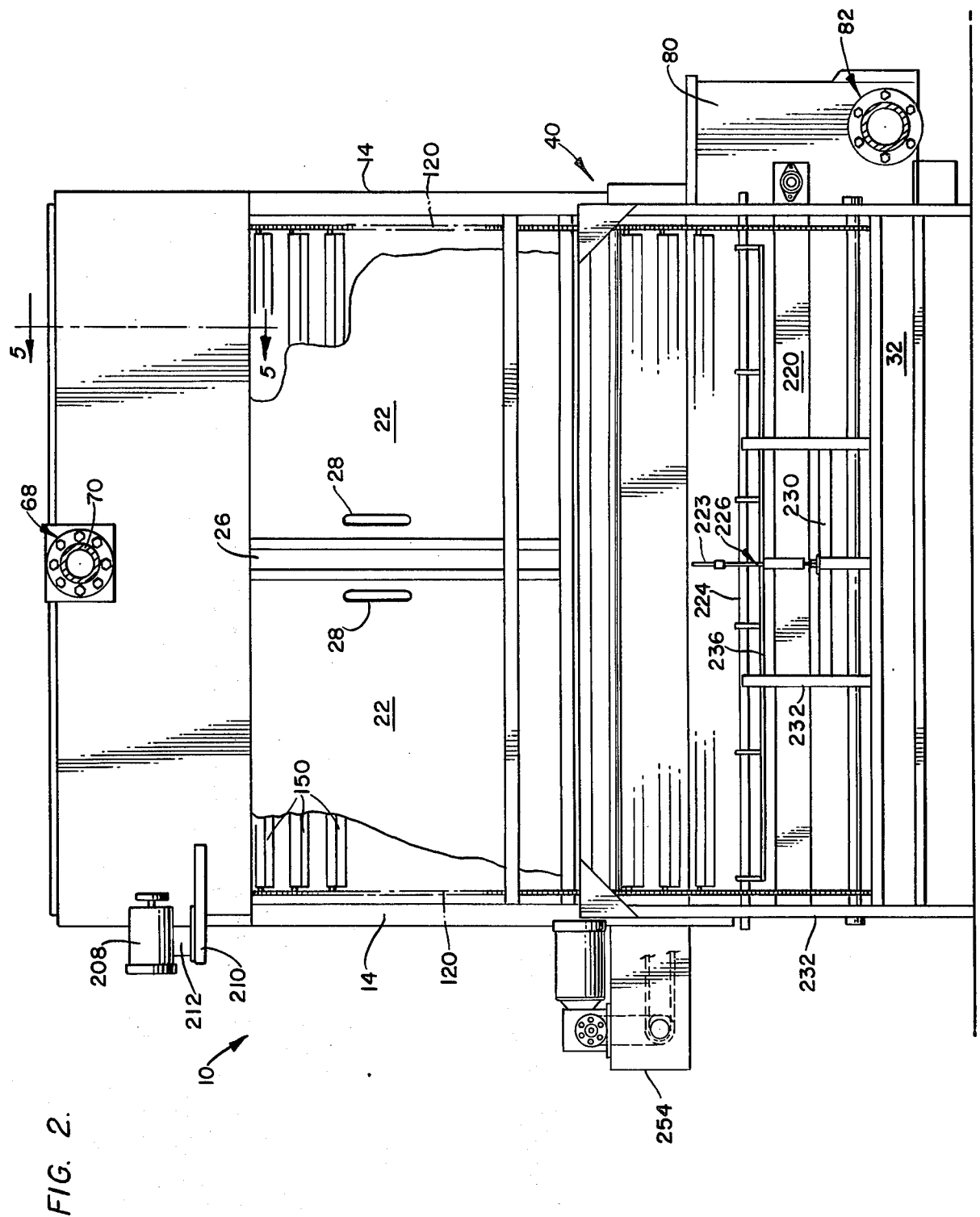
FIG. 2 is a front, elevational view of the chiller of FIG. 1.
Figure 3:
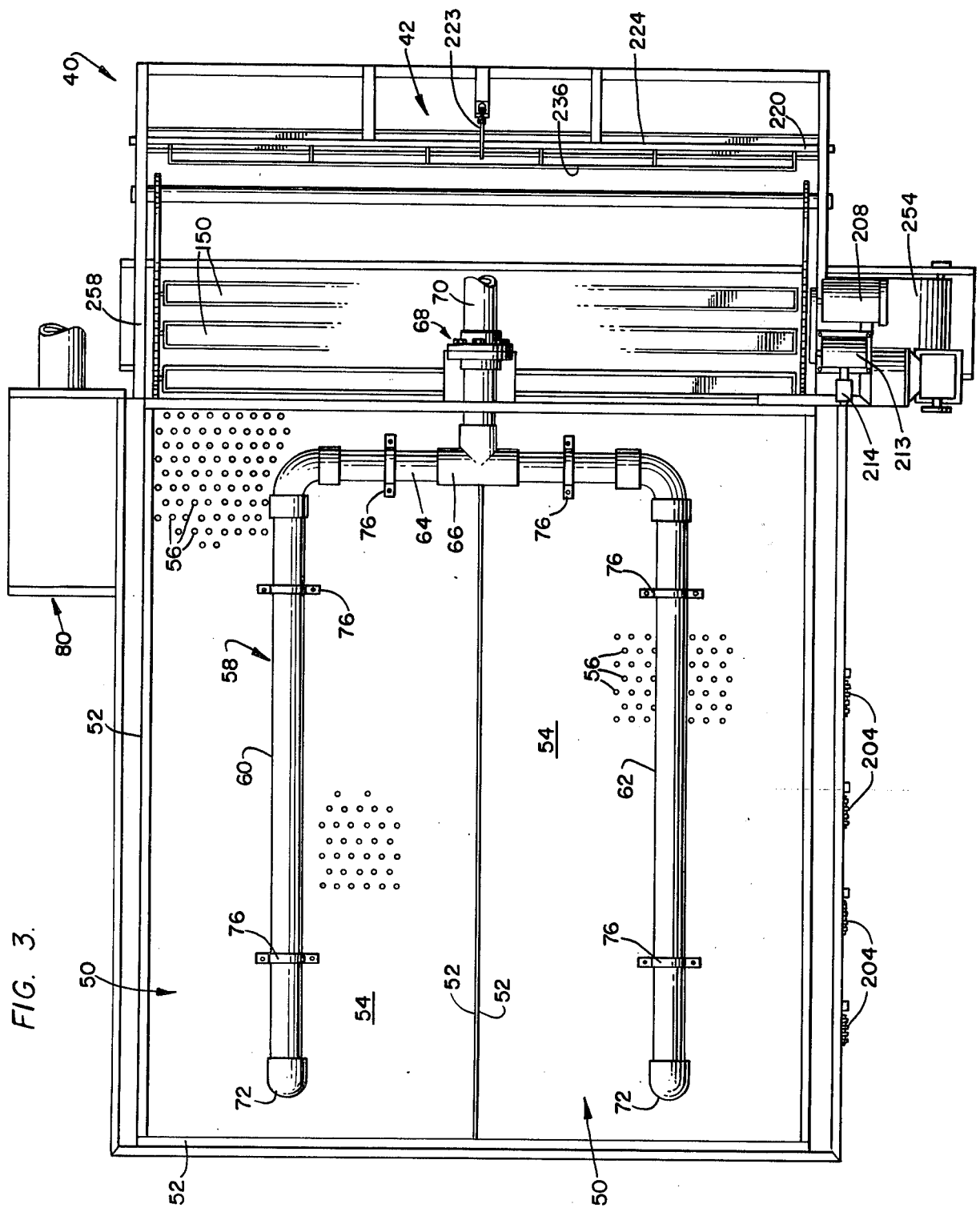
FIG. 3 is a top, plan view of the unique chiller in accordance with the present invention.

The preferred embodiment of the unique glycol chiller for edible food products, in accordance with the present invention, is illustrated in the drawings and generally designated 10. As seen in FIGS. 1, 2 and 3, the chiller includes a main frame 12 including corner supports 14 and intermediate supports 16. The supports 14 and 16 rest on floor pads or foot pads 18. The main frame supports a plurality of side doors 20, front doors 22 and read doors (not shown) to define an enclosure. The doors 20 and 22 are slidably supported on the main frame within tracks defined by retainers 24 and door clamps 26. As seen in FIG. 2, the doors may be provided with suitable handles 28. The doors are slidably mounted relative to the frame structure to define the enclosure therewith yet permit ready access to the interior of the enclosure. Supported at the top of the enclosure is a liquid refrigerant supply or distribution means generally designated 30. Positioned adjacent the lower end of the enclosure is a collection tank 32 for collecting liquid refrigerant after it has cascaded through the enclosure in a manner to be described in detail below. An endless conveyor means generally designated 34 traverses the interior of the enclosure from an entrance 36 to an exit 38 in a serpentine, upward and downward fashion. Positioned adjacent the front of the enclosure is a separate frame assembly generally designated 40. Supported on the frame assembly 40 is a food product load mechanism 42 and a food product unloading mechanism 44. The loading and unloading mechanisms, which will be described in more detail below, are basically conventional in nature.

Figure 4:
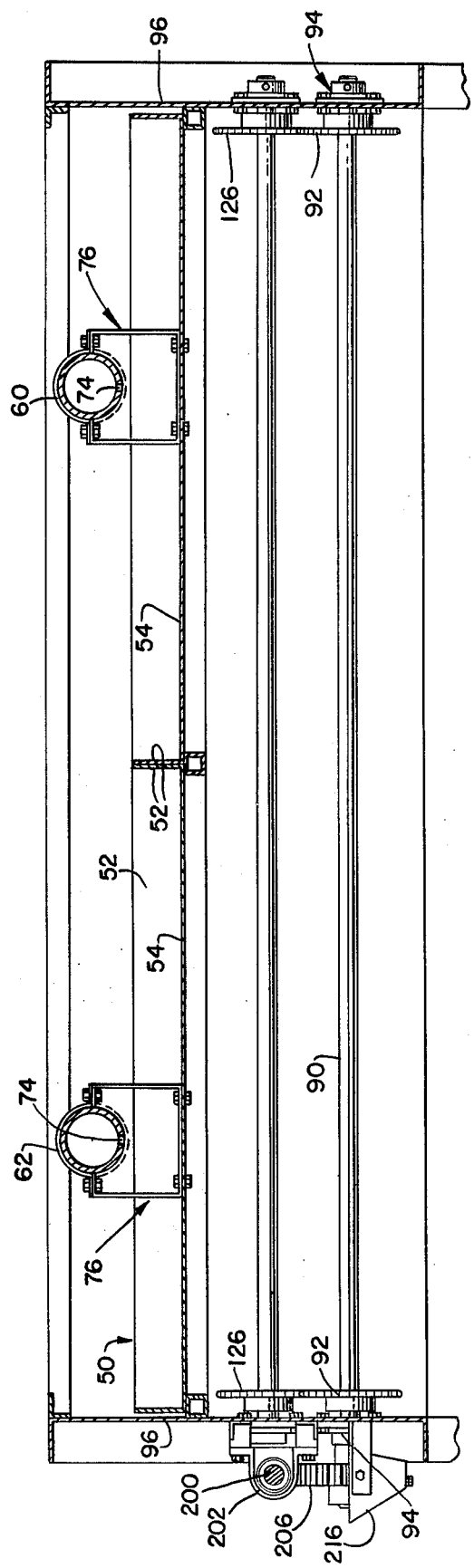
FIG. 4 is an enlarged, cross-sectional view taken along line IV—IV of FIG. 1 with portions of the conveyor removed.

As best seen in FIGS. 1, 3, 4 and 5, the liquid refrigerant supply or distribution means 30 includes a pair of pans 50 supported by the frame 12 at the top of the enclosure above the conveyor means 34. Each pan 50 includes sidewalls 52 and a bottom panel 54 having a plurality of perforations or apertures 56 formed therein. For clarity, only a limited number of the apertures 56 are shown in FIG. 3. The apertures, however, are formed as a plurality of spaced, transversely extending rows. Positioned immediately above the distribution pan 50 is a liquid refrigerant supply header assembly 58. The header assembly is generally U-shaped in plan and includes legs 60, 62 and a base 64. The base 64 is connected to a suitable supply source (not shown) through a T-fitting 66 and a flange connection 68. A supply pipe 70 from a suitable heat exchanger connects to the flange connection 68. The ends of the legs 60, 62 are capped by members 72 and the legs are provided with a plurality of longitudinally spaced apertures or holes 74 (FIG. 4). The liquid refrigerant such as glycol, which is cooled in the heat exchanger, is pumped to the header subassembly 58 and flows into the pans 50 through the apertures 74 formed in the pipes 60, 62. The legs or pipes 60, 62 are supported on the pans 50 by header clamp assemblies 76. As should be readily apparent, the liquid refrigerant supplied to the pans 50 will be directed downwardly through the enclosure in streams through the apertures 56 which extend over the entire bottom walls 54 of the pans 50. The liquid refrigerant after it passes down through the enclosure and cascades over the food product conveyed therethrough by conveyor means 34 is collected within the bottom collection tank 32 and flows to an outlet box 80. The outlet box 80 is connected to the suitable heat exchanger at a flange connection 82 (FIG. 2).

Figure 5:
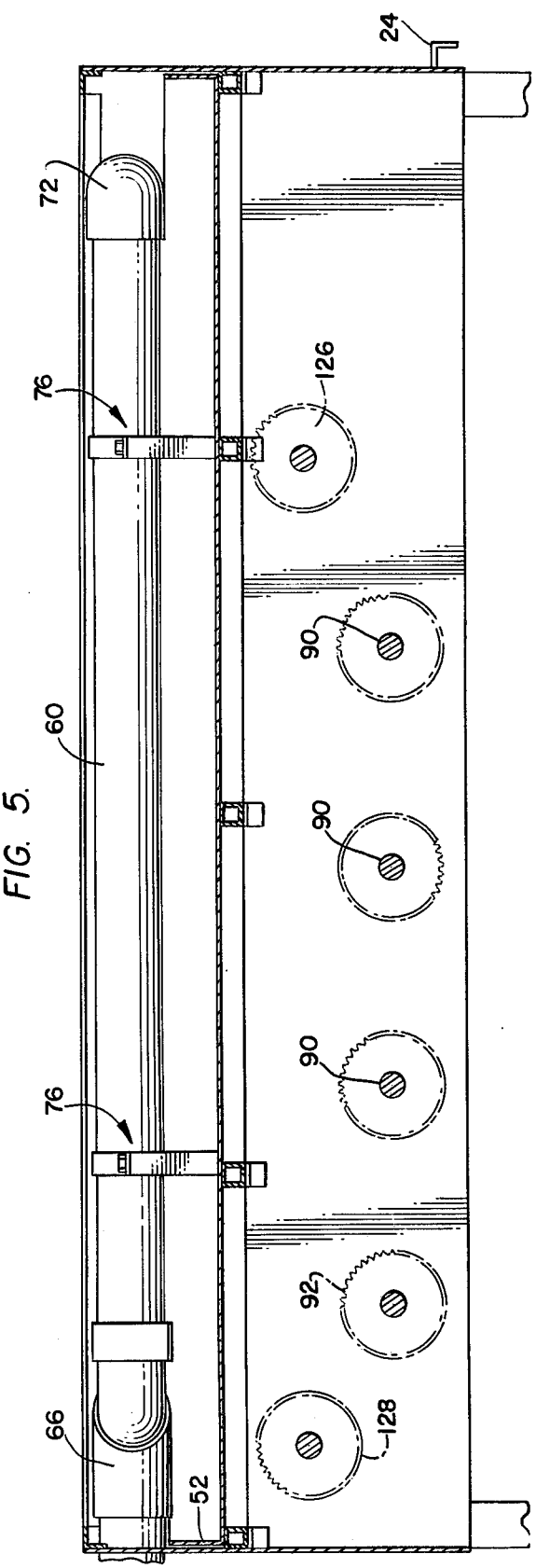
FIG. 5 is an enlarged, cross-sectional view taken generally along line V—V of FIG. 2 with portions of the conveyor removed.

The unique conveyor means 34 transports the edible food product through the enclosure means so that the liquid refrigerant flowing downwardly from the distribution pans 50 will contact the edible food product transported thereby in a cascading manner. As seen in FIGS. 1, 2, 4 and 5, the conveyor means 34 includes a plurality of spaced, parallel main conveyor shafts 90. The shafts 90 extend transversely of the sides of the enclosure, parallel to each other and all of the shafts lie in the same horizontal plane. As best seen in FIGS. 4 and 5, each of the shafts 90 have supported thereon a pair of sprockets 92 positioned at the opposite ends of the shaft. The shafts 90 are supported by end bearing assemblies 94 secured to upper side plates 96 of the enclosure.

Figure 7:
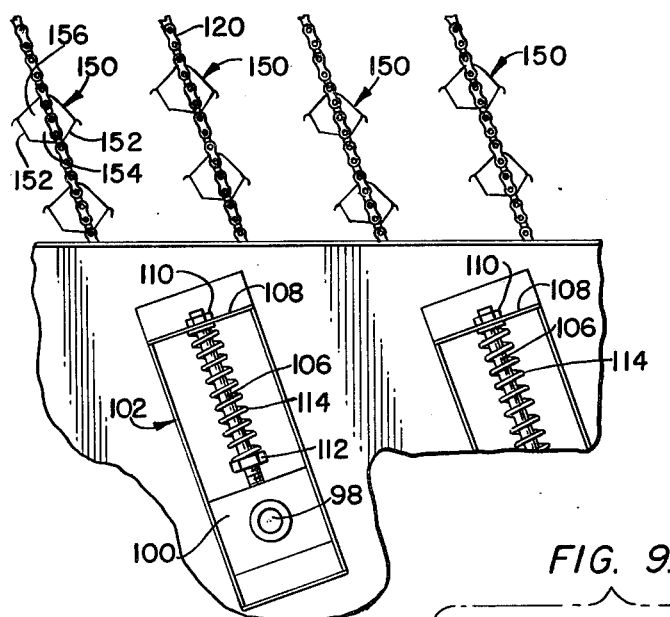
FIG. 7 is a fragmentary, side elevational view showning a portion of the conveyor means.

Extending transversely of the enclosure in vertically spaced, parallel relationship to the upper shafts 90 are a plurality of slidably mounted, lower shafts 98. The ends of each of the shafts 98 are supported within sliding bearing blocks 100 (FIGS. 1 and 7). The bearing blocks 100 are slidably received within a guide structure 102 defined on lower side plates 104. A shaft or rod 106 extends from the sliding block 100 to an end wall 108 of the guide structure 102. The free end of the rod 106 is threaded and provided with a stop nut 110. Positioned on the shaft 106 in spaced relationship to the stop nut 110 is a spring adjustment nut 112. Abutting the spring adjustment nut 112 and the innerface of the end wall 108 is a coil spring 114. As should now be apparent, the coil spring 114 biases the sliding block 100 away from the end wall 108 and the adjustable nut 110 serves as a stop to limit movement of the block 100. The nut 112 may be used to adjust the spring preload. This support structure for each of the lower shafts 98 forms a tensioning mechanism as shall become readily apparent. Sprockets 113 are nonrotatably supported on each end of the shafts 98 in vertically spaced relationship with the sprockets 92 supported on the fixed shaft 90. A pair of flexible driven members or chains 120 extend over the sprockets 92 and 113 within the enclosure defined by the frame and side doors. The sprockets 92 and 113 are spaced equidistant. The chains 120 therefore define a plurality of spaced, parallel, acutely angled upward runs 122 and downward runs 124. Each run lies in a plane angled from vertical. Each of the chains 120 after extending over and around the respective sprockets 92, 113, pass over a pair of sprockets 126, 128 (FIG. 1) positioned at the back and front of the enclosure, respectively and nonrotatably supported on shafts 130, 132, respectively. The chains 120 therefore define a horizontal flight 134. The chains pass downwardly from the sprockets 128 along an exit flight to fixed sprockets 136 supported on a shaft 138 and then through the exit opening 38 of the enclosure. The chain is then passed horizontally to the unloading station or mechanism 44 and then vertically downwardly past the loading mechanism 42 and then through an angled flight into the entrance 36 of the enclosure and around sprockets 140 nonrotatably supported on a shaft 142 adjacent the entrance. Sprockets 141 supported on shafts 143 are mounted on the frame 40 to guide the endless conveyor past the loading and unloading mechanisms.

Pivotally suspended between the parallel chains 120 are a plurality of pans, carriers or trays 150. As best seen in FIG. 7, each of the trays or pans 150 has a generally truncated cone-shaped in transverse cross section and includes angled front and rear walls 152 and a planar bottom 154. The ends of the trays are closed by sidewalls 156. The specific cross-sectional shape aids in preventing freezing of food products such as sausage to the pans. Such freezing may be a problem if pans of semi-circular cross section are employed.

Figure 6:
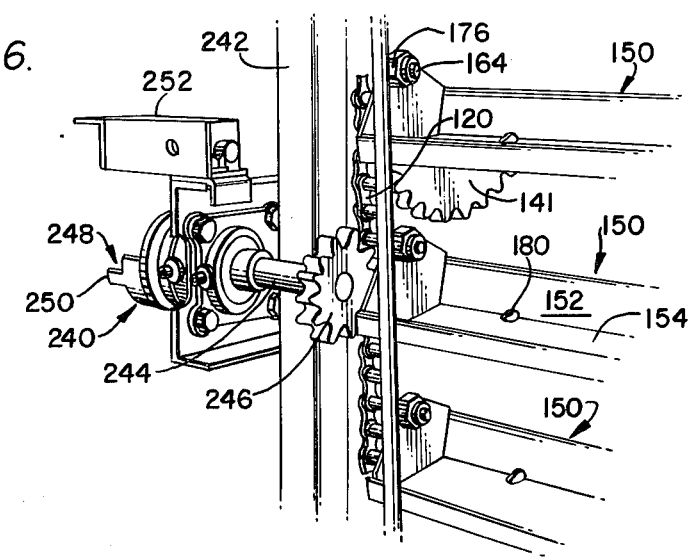
FIG. 6 is a fragmentary, elevational view illustrating a portion of the conveyor and the load timing mechanism.
Figure 8:
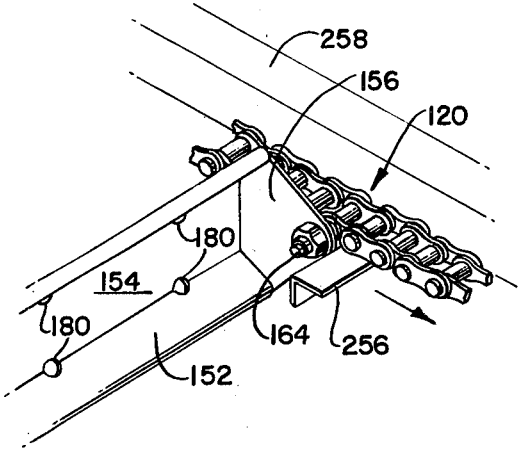
FIG. 8 is a fragmentary, perspective view showing a portion of the unloading mechanism.
Figure 9:
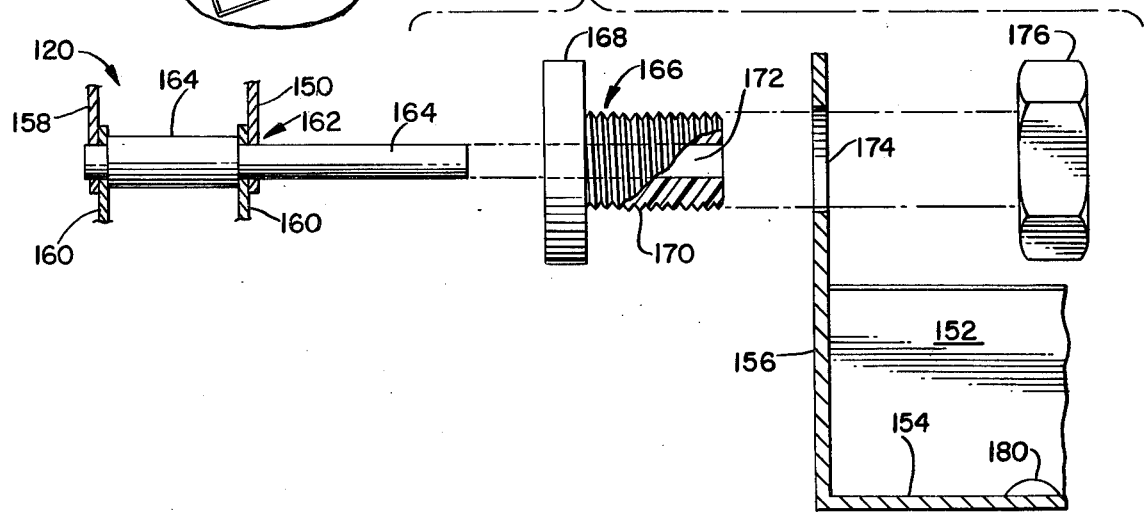
FIG. 9 is an exploded view illustrating the manner by which the individual carrier pans of the conveyor are secured to the conveyor chain members.

As best seen in FIGS. 6, 8 and 9, the trays are pivotally supported at their ends to the chains 120. Each chain includes side plates 158, 160 joined by pins 162 upon which is rotatably disposed a chain roller or bushing 164. At the locations where the pans are supported on the chains, the pins 162 include extensions 164. A plastic bushing 166 including a hub portion 168 and a threaded portion 170 defines a through bore 172 dimensioned to be rotatably received on the pin extension 164. The end wall 156 of each pan is provided with an aperture 174 dimensioned to slip over the threaded portion 170 of the bushing 166. A nut 176 is provided to clamp the end wall 156 against the innerface 178 of the hub portion 168 of the bushing 166.

Each of the pans is suspended at their ends at longitudinally, equally spaced points on the chains 120. The bushings 166, which are preferably fabricated from a plastic material such as Delrin, stabilize the chains and also serve as hangers pivotally supporting the individual pans 156. The pans 156 by virtue of this mounting arrangement, are maintained in a horizontal position as they traverse the various runs of the conveyor means 34. As seen in FIGS. 6, 8 and 9, the pans are provided with a plurality of drain holes 180. The drain holes extend longitudinally along each side of the pan at the juncture between the sidewalls 152 and the bottom wall 154. The drain holes permit the liquid refrigerant which is passing downwardly from the distribution header to pass over the food product contained within the pans and then pass downwardly to contact additional pans and finally pass into the collection tank.

As is apparent from FIG. 1, the upwardly travelling runs 122 and the downwardly travelling runs 124 extend in parallel planes acutely angled from the vertical. In the preferred construction having a height of approximately eleven feet, the runs are angled in a plane offset 20° from vertical. The runs are of equal length so that the number of pans travelling upwardly on the runs 122 equal the number of pans travelling downwardly on the runs 124. In this manner, a balanced load is provided in the chiller. The liquid refrigerant passing downwardly from the apertures in the distribution pan 54 will contact or pass over three to four trays on the downward pass to the collection tank 32 with the preferred 20° angle for the runs 122, 124. This multiple contact of the trays containing the food product with the liquid refrigerant increases the overall efficiency of the chiller, decreases the residence times within the chiller and also reduces the floor space requirements for the quantity of product which may be handled by the chiller. All of this represents substantial improvements and significant advantages over the prior art chillers heretofore available.

The runs of the conveyor may be angled within the range of 16°-24° from vertical with a height of approximately eleven feet. The presently preferred 20° angle was determined empirically. The angle was selected so that the cascading refrigerant would hit or contact as many trays as possible during its downward travel. If the overall height of the conveyor is changed, the angle of the runs also may be changed. For example, if the overall height is increased, a smaller angle could be employed and the floor space requirements for the chiller could be decreased.

The tensioners including the coil springs 114 and the slidable blocks 100 maintain tension on the endless chains 122 as the chains traverse the interior of the enclosure in the serpentine fashion illustrated. The chains are driven by a worm and worm gear arrangement as best seen in FIGS. 1 and 5. The drive mechanism includes an elongated shaft 200 rotatably supported within bearings 202.

Positioned on the shaft 200 at longitudinally spaced points are worms 204. The worms 204 mesh with worm gears 206 positioned on the shafts 90 externally of the enclosure (FIG. 4). The shaft 200 is driven by a motor 208 supported on a bracket 210 through an adjustable motor mount 212. The motor 208 drives the shaft 200 through the gear reducer 213 and a shaft coupling 214. Each of the worm gears 206 extends into a worm gear oiler pan 216. The gears are therefore bathed in oil.

As best seen in FIGS. 1, 2 and 3, the loading mechanism 42 includes a conveyor 220. The conveyor 220 may be a conventional belt, accumulation type conveyor. The food product, which for example may be sausage chubs 222 (FIG. 1), are conveyed into the loading area on the accumulator 220. When the accumulator is loaded, the food product 220 will be transferred to one of the pans 150. The transfer mechanism includes a pivotally mounted arm 223 rotatably supported on an elongated shaft 224. A pneumatic piston cylinder arrangement 226 is operably connected to the arm 223. The lower end 228 of the cylinder is pivotally connected to a bracket 230 carried on a vertical member 232 of the load/unload frame 40. The end of the piston rod 234 is pivotally connected to the arm 223. Extending downwardly from the arm and extending transversely the length of the frame or longitudinally the length of the accumulation conveyor 220 are a pair of spaced, parallel, bar assemblies 236. The bar assemblies 236 are spaced apart a distance equal to the width of the accumulation conveyor 220. As should now be readily apparent, upon retraction of the piston rod 230, the arm 224 will pivot in a clockwise direction when viewed in FIG. 1 and bar 236 will push the food product off the accumulation conveyor into the pan positioned immediately adjacent and at the same level as the accumulation conveyor. Timing of the operation of the piston cylinder 226 may be controlled by a suitable timing cam assembly 240 illustrated in FIG. 6. The timing cam assembly 240 may be mounted on a vertical member 242 of the frame 40 and includes a stub shaft 244 and a timing gear 246 meshing with the vertical run of the chain 120. Secured to the opposite end of the stub shaft 244 is a tabbed cam 248. A pair of tabs 250 are secured to the cylindrical cam 248. The tabs are adapted to contact the switch mountable on bracket 252.

The tabs 250 are preferably spaced circumferentially around the cam 248 a distance of 180°. The cam is dimensioned and the timing sprocket 246 is dimensioned so that a tab 250 will contact the pneumatic switch (not shown) to retract the piston rod when a tray is positioned immediately adjacent the accumulator 220. The opposite tab 250 will then contact the pneumatic switch to extend the piston rod and return the load mechanism and bars 236 back to their load position as shown in FIG. 1. The timing cam, accumulator and load mechanism are basically conventional items which have been adapted for loading of sausage chubs.

The unloading mechanism 44 includes a belt conveyor 254 which extends transversely of the frame structure. As seen in FIG. 8, a stop 256 is secured to a horizontal frame member 258 immediately above the off loading conveyor 254. The end walls 156 of the pans are sloped or angled and a stop 256 is positioned to contact the edge of the end wall 156 as the pan traverses the off loading conveyor 254. As seen in FIG. 8, when the stop 256 contacts the pan, the pan will pivot about the support pins 164 from a horizontal to a near vertical position so that the food product contained within the pan will be dumped onto the belt conveyor 254.

OPERATION

In operation, glycol or other suitable liquid refrigerant will be pumped to the distribution header 58 from a suitable heat exchanger. The glycol will then pass through the apertures 74 formed in the header pipes 60, 62 and collect in the distribution pans 50. The liquid refrigerant passes downwardly from the distribution pans through the apertures 56 formed in the bottom walls 54 thereof. The liquid refrigerant will cascade downwardly onto a plurality of the trays or carriers 150. Each individual stream of liquid refrigerant will contact from three to four of the trays as it cascades downwardly towards the collection tank 32. The individual pans 150 are loaded at the load means or loading mechanism 42 and then passed into the enclosure at the entrance opening 36. Each individual pan will then pass upwardly and downwardly on the angled runs 122, 124 to be contacted by the cascading liquid refrigerant. The trays will traverse the enclosure from the front or entrance opening to the rear of the enclosure and then be transported forwardly along a horizontal run 134. The trays will then pass out of the enclosure at the exit opening 34 to the off loading or unloading station 44 where each individual pan will contact the stop 256 and dump the contents onto the conveyor 254. The flights 122 and 124 comprise cooling flights or runs of the conveyor.

By traversing the enclosure in the serpentine, angled fashion, the residence time within the enclosure may be reduced from that heretofore required in known chillers. Also, the overall floor space requirements per quantity of food product chilled may be reduced thus resulting in increased chiller efficiency. The chiller in accordance with the present invention also results in desirable cost economies when compared to prior art chillers.

While the chiller has been illustrated as being primarily adapted for the treating of sausage type food products or sausage chubs, it of course could be employed to chill any other food product such as poultry products. If necessary, differently dimensioned trays 150 could be substituted to accommodate such other food product.

Various modifications will now undoubtedly become apparent to those of ordinary skill in the art. For example, the manner of suspending the individual pans or trays to the chains could be changed. The primary consideration being that the trays be maintained in a substantially horizontal position as they traverse the serpentine runs or flights within the enclosure. Also, other means could be provided for driving the carriers through the enclosure. Therefore, the above description should be considered as that of the preferred embodiment. The true spirit and scope of the present invention may be determined by reference to the appended claims.

The embodiments of the invention in which an exclusive property or privilege is claimed are defined as follows.

1. A chiller for edible food products of the type employing hygroscopic liquid refrigerant, said chiller comprising:
    an enclosure having an entrance and an exit;
    an endless conveyor means for conveying edible food products and extending within said enclosure from said entrance to said exit of said enclosure, said conveyor defining a plurality of angled flights, said flights extending within said enclosure in spaced, parallel relation to each other, alternate flights extending upwardly and downwardly to alternately convey edible food products in upward and downward directions, and each of said flights being disposed in a plane angled with respect to a vertical plane at an angle α less than 90°; and
    a liquid refrigerant supply means positioned in said enclosure for directing liquid refrigerant downwardly over the edible food products carried by said conveyor, said alternate flights extending upwardly and downwardly providing for said liquid refrigerant contacting edible food products on several of said flights in a cascading manner to increase the contact between the edible food products and said refrigerant and to evenly cool the edible food products.

2. A chiller as defined by claim 1 wherein said conveyor means comprises:
    a pair of spaced, parallel, flexible driven members; and
    a plurality of food product trays extending transversely of said enclosure and pivotally supported at each end at said flexible driven members.

3. A chiller as defined by claim 2 wherein said liquid refrigerant supply means comprises:
    a distributor pan positioned within said enclosure above said conveyor, said pan defining a plurality of perforations through which said liquid refrigerant passes downwardly; and
    a collection pan positioned within said enclosure below said conveyor for collecting liquid refrigerant after it contacts the food product trays of each flight of said conveyor.

4. A chiller as defined by claim 3 wherein said flexible driven members each comprise elongated, endless chains.

5. A chiller as defined by claim 4 wherein said endless chains are each driven by a plurality of sprockets, selected ones of said sprockets supported in said enclosure in a pair of vertically spaced rows to thereby define with said endless chains said plurality of angled flights.

6. A chiller as defined by claim 5 further including resilient chain tensioning means engaging selected ones of said sprockets for tensioning said endless chains.

7. A chiller for cooling edible food products by a cascading liquid refrigerant, said chiller comprising:
    an enclosure having spaced parallel sides joined by transversely extending ends, one of said ends defining an inlet and an outlet;
    endless conveyor means entering said enclosure at said inlet and leaving said enclosure at said outlet for transporting edible food products within said enclosure, said endless conveyor means including an inlet flight, a plurality of cooling flights extending within said enclosure, alternate cooling flights extending upwardly and downwardly in planes angled with respect to the vertical at an angle α less than 90° to alternately convey edible food products in upward and downward directions, and an outlet flight; and
    liquid refrigerant distribution means supported above said cooling flights for directing streams of refrigerant downwardly within said enclosure so that each of said streams intersects a plurality of said alternate cooling flights extending upwardly and downwardly to increase contact between the edible food products and said refrigerant and to evenly cool the edible food products.

8. A chiller as defined by claim 7 further including a liquid refrigerant collection tank positioned within said enclosure below said cooling flights for collecting said liquid refrigerant streams.

9. A chiller as defined by claim 8 wherein said endless conveyor means includes a plurality of food product support pans, each of said pans having perforated bottoms, and each of said pans being pivotally supported, said perforated bottoms being in substantially horizontal planes while being transported within said enclosure.

10. A chiller as defined by claim 9 further including loading means adjacent said conveyor means for loading edible food products into said pans.

11. A chiller as defined by claim 10 further including unloading means for automatically unloading said product from said pans after said pans leave said outlet of said enclosure.

12. An improved hygroscopic liquid refrigerant chiller of the type including an enclosure defining an inlet and an outlet and liquid refrigerant distributing means for directing streams of refrigerant downwardly within said enclosure, said improvement comprising:

an endless conveyor means supported within said enclosure for conveying food products within said enclosure from said inlet to said outlet along a horizontal and vertical path so that said food products travel within said enclosure along upwardly and downwardly extending runs said runs being arranged in a parallel array disposed at an angle $\alpha$ less than 90° with respect to vertical, said streams of refrigerant contacting a plurality of food products, on different upwardly and downwardly extending runs to increase contact between the edible food products and the refrigerant and to evenly cool the edible food products as said refrigerant is directed downwardly by said distribution means.

13. An improved chiller as defined by claim 12 wherein said conveyor means comprises:

a plurality of driven sprockets supported within said enclosure;

endless, flexible tension members supported and driven by said sprockets; and edible food product carrier means carried by said endless flexible tension members for carrying said food product.

14. An improved chiller as defined by claim 13 wherein said each of said runs is angled with respect to vertical at an angle $\alpha$ within the range of 16°–24°.

15. A hygroscopic liquid refrigerant chiller adapted for chilling edible food products, comprising:

an endless conveyor means for transporting edible food products along a plurality of angled, vertically and horizontally extending upward and downward moving runs, said runs extending parallel to each other at an angle $\alpha$ less than 90° with respect to vertical so that said product is transported in a serpentine, upward then downward fashion;

an enclosure surrounding and enclosing said angled runs of said conveyor;

liquid refrigerant distribution means within said enclosure for directing a plurality of streams of liquid refrigerant downwardly within said enclosure, each of said streams contacting a plurality of said food products on vertically spaced portions of said angled runs, said food products contacted being on different upward and downward moving runs of said conveyor to increase contact between the edible food products and the refrigerant and to evenly cool the edible food products.

16. A hygroscopic liquid refrigerant chiller as defined by claim 15 wherein the number of upward moving runs equal the number of downward moving runs.

17. A hygroscopic liquid refrigerant chiller as defined by claim 16 wherein said conveyor means includes a plurality of equally spaced, parallel, transversely extending food product carriers, each of said carriers having perforated bottoms permitting said refrigerant to pass downwardly therethrough.

18. A hygroscopic liquid refrigerant chiller as defined by claim 17 wherein each of said carriers has a generally truncated cone shape in transverse section and includes angled sidewalls and a planar bottom.

19. A hygroscopic liquid refrigerant chiller as defined by claim 17 wherein said upward moving runs and said downward moving runs are angled from vertical at an angle $\alpha$ of 20°.

* * * * *